Sept. 6, 1927.

J. V. JARDINE 1,641,928

PIPE CUTTER OR THREADER

Filed March 30, 1925

INVENTOR.
J. V. Jardine.
BY J. Edward Maybee.
ATTY.

Patented Sept. 6, 1927.

1,641,928

UNITED STATES PATENT OFFICE.

JAMES VALTIN JARDINE, OF HESPELER, ONTARIO, CANADA, ASSIGNOR TO A. B. JARDINE & CO. LIMITED, OF HESPELER, CANADA.

PIPE CUTTER OR THREADER.

Application filed March 30, 1925. Serial No. 19,272.

This invention relates to devices used on pipe cutting and threading apparatus to center the pipe while it is being operated on, and particularly to that type in which the same apparatus may be used to center pipe of various diameters within the limit of the apparatus, and the object of the present invention is to devise apparatus of this type which may be very simple, quickly and accurately set, and by means of which the pipe will be very firmly held.

Figure 1:
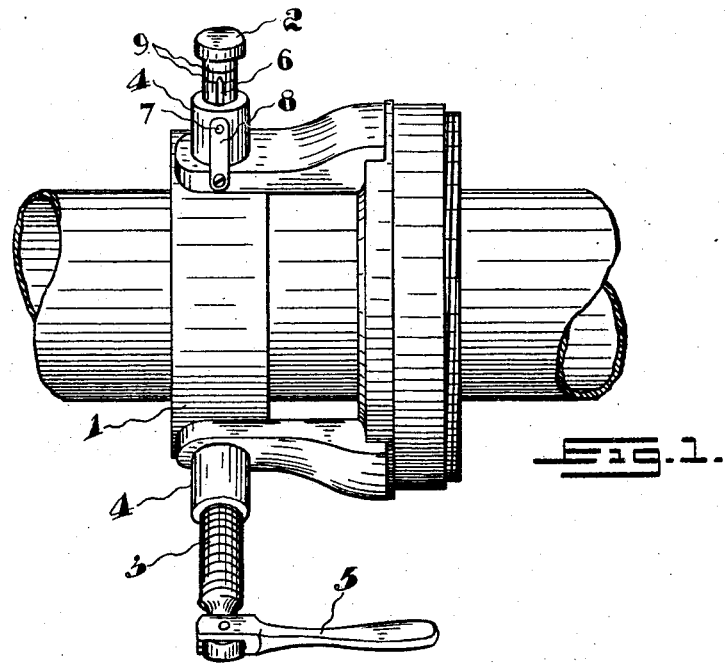
Figure 2:
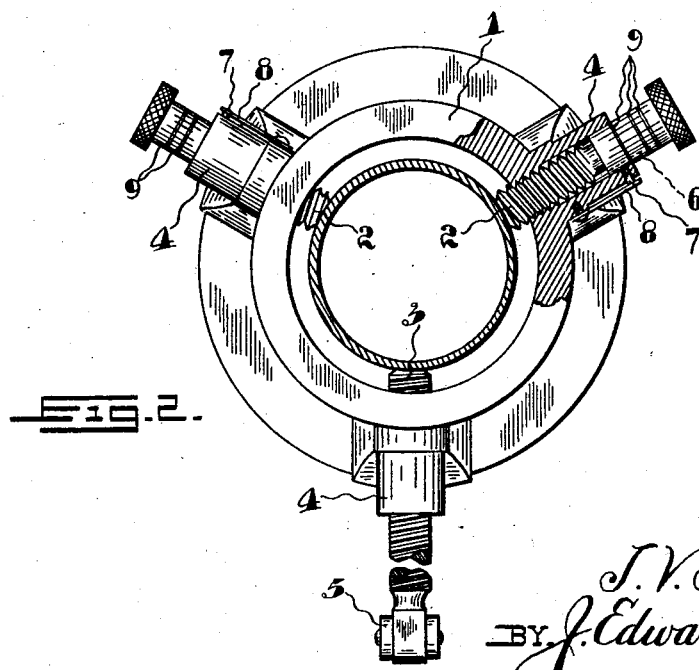

I attain my object by means of the constructions hereinafter described and illustrated in the accompanying drawings in which Fig. 1 is a side elevation showing a piece of pipe held in my improved centering apparatus; and Fig. 2 a front view, partly broken away of the same.

In the drawings like numerals of reference indicate corresponding parts in the different figures.

1 is a collar or work holder, which, in actual practice, will be mounted on a suitable support.

Threaded in holes formed in this collar are two clamping members 2 and a third clamping member 3, arranged substantially 120 degrees apart. Bosses 4 are formed on the outer side of the collar 1, through which bosses the holes for the clamping members are formed to give the latter greater support.

The clamping member 3 is simply an ordinary threaded pin, provided with a suitable handle 5 at its head by means of which it may be rotated.

The clamping members 2 are also threaded through the collar, but the thread is so arranged that a single complete turn will advance or retract the clamping members half the difference between the outside diameters of any size of pipe within the limit of the apparatus for example 1¼" and the outside diameter of the next size larger or smaller for example 1½" or 1" as the case may be, excepting from 1½" to 2" which requires two complete turns. For ordinary standard pipes I find that to secure the desired results the thread must be arranged 8⅓ threads to the inch.

As a guide to the operator to indicate the completion of a turn, each clamping member is formed with a groove 6, into which extends a pin 7 carried by a spring arm 8 mounted on the outside of the boss 4, said boss being provided with a suitable hole through which the pin may pass.

Each clamping member 2 is also provided with a series of graduations 9 so that the operator may see which size pipe the clamping members are set to engage.

The operation of the device is as follows. The clamping members 2 will be set at the 1" size, the clamping member 3 will be sufficiently retracted, the pipe introduced and the clamping member 3 then advanced until the pipe is firmly clamped by the three clamping members. The pipe may then be cut or threaded as desired and thereafter be removed, the clamping member 3 having, of course, first been retracted.

Assuming now, it is desired to work on 1¼" pipe, the clamping members 2 will be retracted by giving them a single complete turn, or if it is desired to work on 1½" pipe the clamping members will be retracted by giving them two complete turns, and the pipe will then be introduced and clamped by advancing the member 3 until it firmly engages the pipe.

From the above description it will be seen that I have devised centering apparatus which will satisfactorily attain the object of my invention as set out in the preamble of this specification.

What I claim is:

In a centering device for pipe cutting and threading machines, the combination of an annular holder adapted for the reception of a series of pipes, any two of which differ in diameter by a predetermined amount or multiples of said amount, and provided with three radially directed holes therethrough, clamping members threaded through said holes, the threads on two of said clamping members having such a pitch that an equal number of turns of both of said members and a similar longitudinal movement of the third clamping member will have advanced or retracted said members a sufficient distance to properly centre and clamp another pipe in said series, and resilient means for each of the two first mentioned members tending to prevent further movement of said members upon the completion of a full turn, said means comprising a spring mounted on the ring, a projection on said spring, said clamping member being provided with a groove formed longitudinally thereof in which said projection is adapted to engage.

Signed at Preston Ont., this 4th day of March, 1925.

JAMES VALTIN JARDINE.